No. 761,614. PATENTED MAY 31, 1904.
E. A. SMITH.
WEIGHT TESTING MACHINE.
APPLICATION FILED NOV. 17, 1902.
NO MODEL. 4 SHEETS—SHEET 1.

Fig. 1

WITNESSES:
William P. Smith
Arlita Adams

INVENTOR,
Edmund A. Smith
BY Frank E. Adams
ATTORNEY.

No. 761,614. PATENTED MAY 31, 1904.
E. A. SMITH.
WEIGHT TESTING MACHINE.
APPLICATION FILED NOV. 17, 1902.
NO MODEL. 4 SHEETS—SHEET 2.

WITNESSES:
William P. Smith
Arleta Adams

INVENTOR.
Edmund A. Smith
BY Frank E. Adams
ATTORNEY.

THE NORRIS PETERS CO., PHOTO-LITHO., WASHINGTON, D. C.

No. 761,614. PATENTED MAY 31, 1904.
E. A. SMITH.
WEIGHT TESTING MACHINE.
APPLICATION FILED NOV. 17, 1902.
NO MODEL. 4 SHEETS—SHEET 4.

Fig. 8.

Witnesses
William P. Smith
Arlita Adams

Inventor
Edmund A. Smith
By Frank E. Adams
Attorney

No. 761,614.                                         Patented May 31, 1904.

UNITED STATES PATENT OFFICE.

EDMUND AUGUSTINE SMITH, OF SEATTLE, WASHINGTON, ASSIGNOR TO SMITH MANUFACTURING COMPANY, OF SEATTLE, WASHINGTON, A CORPORATION OF WASHINGTON.

WEIGHT-TESTING MACHINE.

SPECIFICATION forming part of Letters Patent No. 761,614, dated May 31, 1904.

Application filed November 17, 1902. Serial No. 131,699. (No model.)

*To all whom it may concern:*

Be it known that I, EDMUND AUGUSTINE SMITH, a citizen of Canada, but having declared my intention of becoming a citizen of the United States, and a resident of the city of Seattle, in the county of King and State of Washington, have invented certain new and useful Improvements in Weight-Testing Machines, of which the following is a specification.

My invention relates to improvements in devices adapted to test the weight of packages and assort same in conformity therewith, and has reference to an apparatus of this class which acts automatically and is especially adapted to test and assort filled cans.

Among numerous objects attained by this invention and readily understood from the following specification and accompanying drawings, included as a part thereof, is the production of an inexpensive automatic weight-testing and assorting machine embodying essential features of adaptability, simplicity, and general efficiency which greatly facilitates the labor of testing the weight of packages, insures detection of the packages which are light in weight, and renders it possible to produce a superior and compactly-arranged machine of this class at comparatively small cost.

The above-mentioned and numerous other objects equally as desirable are attained by the constructions, combinations, and arrangement of parts, as disclosed on the drawings, set forth in this specification, and succinctly pointed out in the appended claims.

With reference to the drawings filed herewith and bearing similar reference characters for corresponding parts throughout.

This invention includes a frame, as 8, suitable weight-testing apparatus, as a scale 9, operable mechanism associated with the scale for placing and removing packages relatively thereto, and package-assorting mechanism coactingly related to the removing mechanism and operably controlled by the weight of the packages tested. The frame 8 is rendered of any desired form suitable to support the several parts of the machine, but as now considered comprises in the main a base-plate 10, a standard 11, arranged adjacent one side edge of the base to support the package-shifting device 12 relatively to the scale 9, and vertical side pieces 10', suitably disposed to support the mechanism of the conveyers, as 14, 15, and 15', which are adapted to conveniently transport the packages to and from said shifter.

In the present embodiment the scale 9 includes an upper and a lower beam, respectively marked as 16 and 16', which are connected at one end to a suitable bracket 17 by respective pivots 20, a vertical bar 18, pivotally connected to the free end of each beam and supporting the platform 19 of the scale, and a suitable weight-testing spring 21, attached at one end to the lower end of said bar and connected at the upper end to an adjustable screw 22, which has screw-threaded engagement with a thumb-nut 23, suitably seated on a laterally-projecting leaf 24 of said bracket, so that the tension of said spring may be adjusted, and as now considered a suitable adjustable stop, as a vertically-disposed thumb-bolt 25, having a screw-threaded engagement with said leaf and normally lying with the lower end impinging the upper beam, is arranged to hold said spring at a predetermined tension slightly less than that imposed by a package of standard weight, so that the movement of platform 19 will be reduced to a minimum and the shifting of the packages facilitated relatively thereto.

The shifting device 12 includes a suitable carrier 26, preferably consisting of an endless link belt arranged on horizontally-disposed chain-wheels, as 27, rotatably mounted as idlers in any convenient manner on the upper end of standard 11. This chain is adapted to carry laterally-projecting package-gripping jaws, as 28, which are operably mounted on the chain throughout its length, so as to open and close relatively to each other to grasp the packages therebetween, and each jaw preferably comprises a rotatable stem 29, having oppositely-disposed gripping-faces 30, which coöperate with the gripping-faces of the adjacent jaws to grasp the package and mounted on a horizontally-disposed pivot 31, seated on a shoe, as 32, suitably attached to a link of the chain. In the present instance the gripping-faces 30 are conveniently rendered flexible, so as to conform to the size and contour of the package as each pair of the jaws are brought to grip the same, and as now considered each face comprises a section of closely-coiled resilient wire supported on the outer ends of suitable laterally-projecting arms, as 33, fastened on the stem at separated points.

The shoes 32 each consists of a bar of metal rectangular in cross-section and having a notch 34 in the outer side surface adapted to receive a wiper 35, which consists of a laterally-projecting finger secured to the base of a respective stem 29 and normally bearing upon a track, as 36, arranged along the path of movement of the shoes as the base-wall of a suitable guideway, as 36′, adapted for the chain. This track is broken away at suitable points, as 37, so that the wipers will ride free thereof at predetermined points and allow the jaws to rotate responsively to action of a suitable spring 38, attached to said shoes and to lugs 38′ on the stems 29. In the present instance these wipers are suitably positioned to bear upon said track when the jaws are in closed position, and the breaks in the track are suitably disposed to allow the jaws to swing open at suitable points to receive the packages to be tested and also at the point of delivery of the gripped packages to the scales. As now considered three closely-associated breaks occur in the track along one side of the shifter and are so disposed that three of the jaws standing in gripping relations to each other will be opened and closed simultaneously, and the packages to be tested are delivered to the shifter between the rear and intermediate jaws as they stand open, and the scale-platform 19 is placed to receive the gripped package from these jaws as they open after advancement. In the present embodiment the shifter operates intermittently step by step to afford ample time between each movement for the package to be properly weighed, and the length of each step conforms to the distance between the point of delivery of the packages to the shifter and the platform of the scale. This motion is given to the shifter by a continuously-operating driver 39, Fig. 3, consisting of a connecting-rod 40, having upwardly-projecting drive-arms 41, preferably spaced equally to the jaws of the shifter, and a downwardly-extending lug 43, oppositely-disposed cranks 42, suitably pivotally mounted beneath the shifter and having their crank-pins disposed at radii equal to half of the length of a step of the shifter and engaged with said rod and adapted to movably support the same, and a driving-crank 44 of equal throw to said crank-arms and fixed on a suitably-mounted drive-shaft 45, with the crank-pin operably engaged with lug 43. This driver is suitably disposed to cause the upper ends of the drive-arms to come in contact with the stems of the jaws just as the crank-arms pass upwardly from a horizontal position, Fig. 2, and thereby serve to advance the shifter during the upper half of each revolution and to play clear of the shifter and allow it to lie momentarily idle during the lower half. The packages to be tested are conveniently brought to the shifter by a conveyer 14, which preferably comprises a section of ordinary leather belting operably mounted on horizontally-disposed idlers 46, suitably positioned to lead the belt at right angles to the line of active travel of the shifter, with the delivery end directly beneath the first two breaks in the track 36, with the upper run of the belt in substantially the same plane with the upper surface of scale-platform and one edge closely adjacent thereto. The packages tested are conveniently taken from the shifter after their removal from the scale by means of conveyers 15 and 15′, the latter of which is arranged substantially the same as the conveyer 14 on the idlers 46′, placed at the opposite side of the machine, and the latter is mounted on idlers 47, disposed at right angles to idlers 46′ and suitably positioned to lead the belt in direct alinement with the line of active travel of the shifter, with the receiving end of the upper run passing over conveyer 15′ closely adjacent the scale-platform 19, so when a leading jaw on the shifter passes about the rear chain-wheel it clears from the package, which is then carried away on belt 15, or, if desired, the package can be forced to travel diagonally across this belt to the belt 15′ by means of a suitable operable switch, as 49, which is brought diagonally across the line of travel of the package, whereby the packages can be assorted as they come from the shifter.

The conveyer 15 is suitably driven by a pulley 50, placed between the runs thereof with the periphery in contact with the lower run, and having laterally-projecting lugs 51, which operate in suitable apertures arranged in the belt to increase traction. This pulley is secured to a shaft 52, mounted in the frame 8 and driven from drive-shaft 45 by a suitable belt 53 and rendered of suitable length to extend to a shaft 54, journaled in frame 8 and which carries a pulley 56 similar to pulley 50 and is engaged with the lower run of conveyer 15', and a similar pulley 59 is likewise mounted in contact with the lower run of conveyer 14 on a shaft 54'. The shaft 52 is operably coupled to shaft 54 by a pair of bevel-gears 58, and shaft 54 is operably coupled to shaft 54' by a train of bevel-gears 58', whereby the conveyers will be operated simultaneously and be made to travel in the desired directions. As now considered guard-rails, as 60, are suitably supported parallel the edges of the conveyers on the side pieces of frame 8 at the proper elevation thereabove to prevent lateral displacement of the packages as conveyed, and a suitable plate, as 61, is arranged beneath the active run of each conveyer to support same and keep it from sagging.

To conveniently regulate the feed of the packages to the shifter, an operable check, as 62, is disposed adjacent the delivery end of conveyer 14 and includes spring-advanced stops, as 63, reciprocally mounted one in advance of the other at one side of the conveyer so when in advanced position they will project into the path of movement of the packages and when retracted will lie clear thereof. These stops are rendered substantially U-shaped and each placed with the bent portions disposed inwardly relatively to the conveyer, and the stems are slidably mounted in suitable horizontally-disposed apertures formed one over the other in a housing 64, and springs 65 are suitably connected to the stops to normally yieldingly hold them in advanced position, and a rock-bar 66 is operably related to said stops to retract them alternately, and thereby release a preceding package while holding in check the succeeding packages. As now considered the stops are suitably separated to embrace the package, and the rock-bar 66 is composed of a vertical shaft suitably rotatably mounted at one side of frame 9 and oppositely-disposed pins 67, arranged thereon at right angles thereto and rendered of suitable length to engage in respective stirrups 68, which are connected to bars 69, fixed on the ends of the stems of said stops.

The rock-bar 66 is suitably operably connected to drive-shaft 45 by means of a cam 67', which is secured to said shaft, a spring-retracted slide-bar 68', having a roller 69' mounted thereon in contact with said cam, and an arm 70, fixed to said bar and pivotally engaged with an arm 71, fixed to said rock-bar, whereby the arm is reciprocated to operate the check 62 to release the packages correlatively to the steps of the shifter.

In the present embodiment the package-assorting switch 49 comprises a vertically-disposed shaft 71', suitably rotatably mounted in the frame 8 at one side of the conveyer 15 and having a laterally-disposed arm 72 fixed thereto above said conveyer and which is of suitable length to extend diagonally thereacross. This switch is operably related to the shifter-driving mechanism and its action placed under control of the package as weighted by suitable mechanism operably related to the mechanism of scale 9, so that if the package weighed is light the switch is automatically set by action of said shifter-driving mechanism to force the package to travel diagonally across conveyer 15 as it is removed from the scales, and thereby switches same to conveyer 15'.

Figure 1:
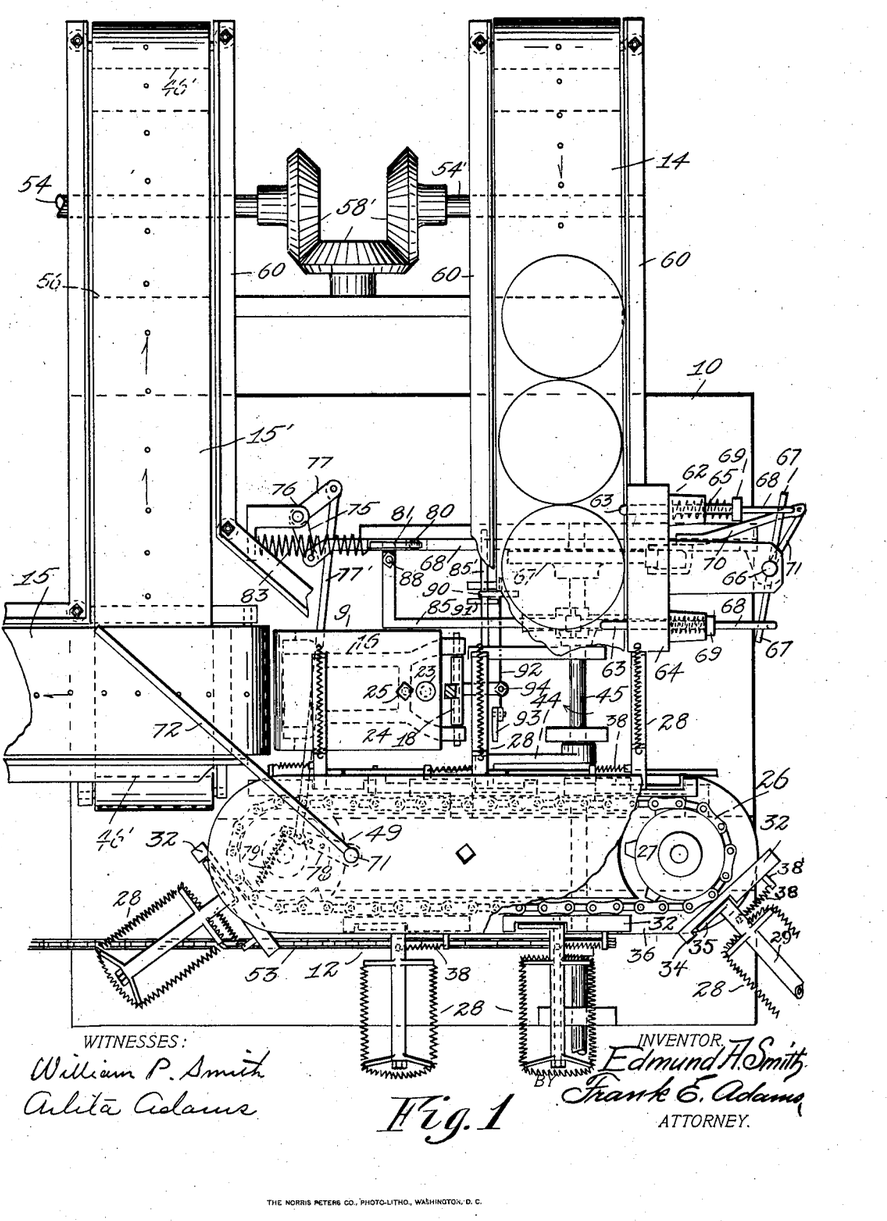
Figure 1 is a plan view of the machine with the outer portions of one of the package-conveyers and one of the jaws of the shifter broken away and other parts of the machine broken out to better disclose the details of construction.
Figures 2, 3, 4, 5, 6:
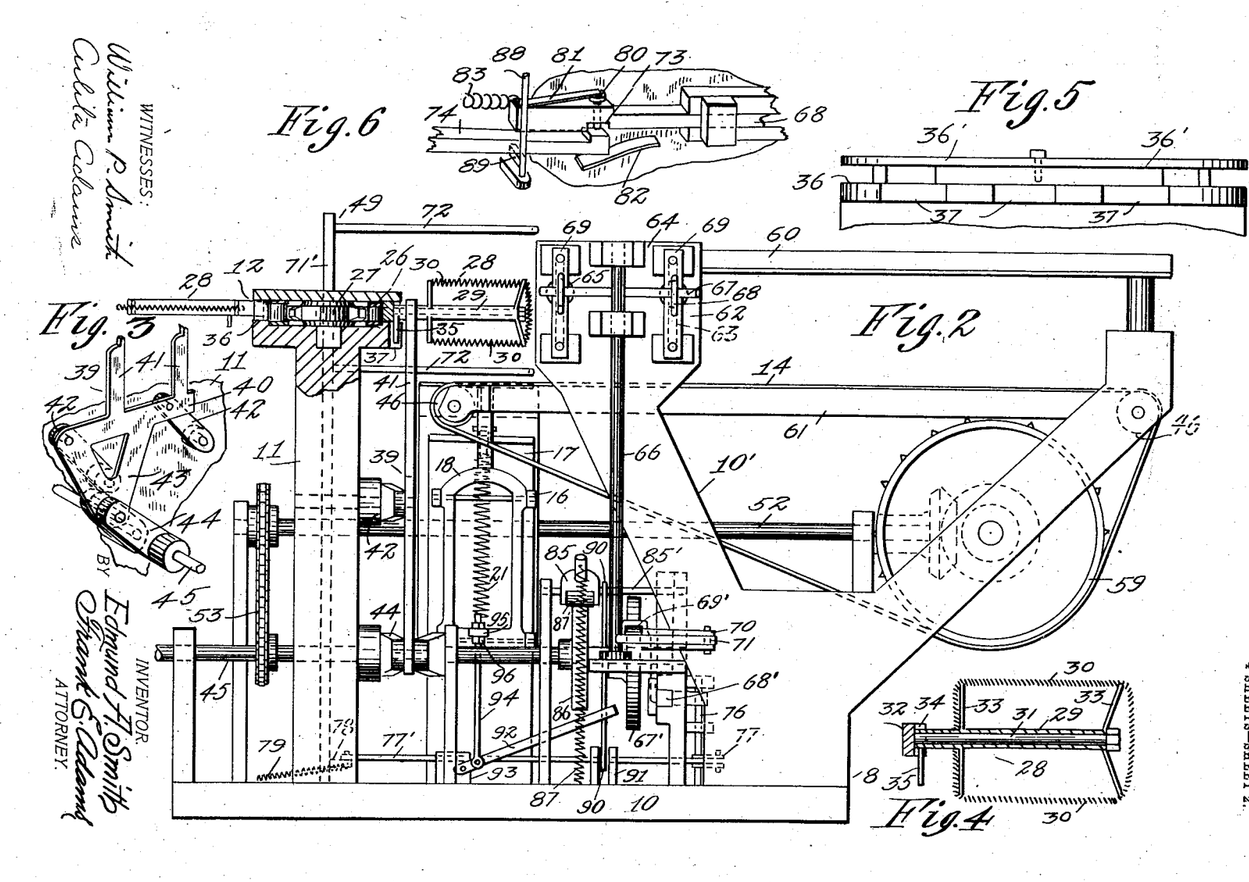
Fig. 2 is a view in side elevation of the machine and indicates the package-shifter in transverse section, taken on line 2 2 of Fig. 1.
Fig. 3 is a perspective view, on small scale, of the driver adapted to operate the shifter detached from the machine.
Fig. 4 is a view in longitudinal section of one of the double jaws of the shifter removed.
Fig. 5 is a view in side elevation of the guide for the shifter.
Fig. 6 is a view in perspective of a portion of the package-assorting mechanism.
Figure 7:
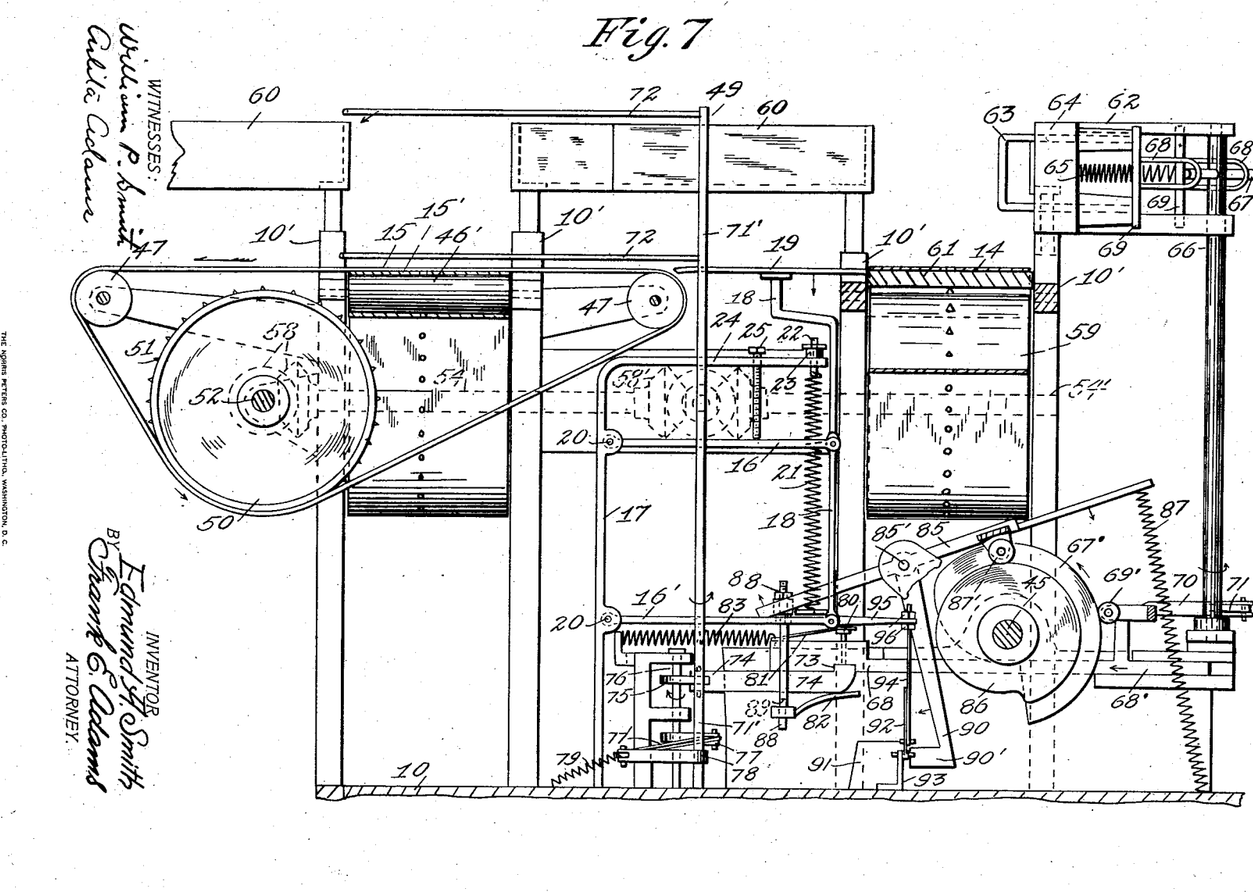
Fig. 7 is a vertical transverse section of the machine on line 7 7 of Fig. 1 and viewed as the arrows indicate.
Figure 8:
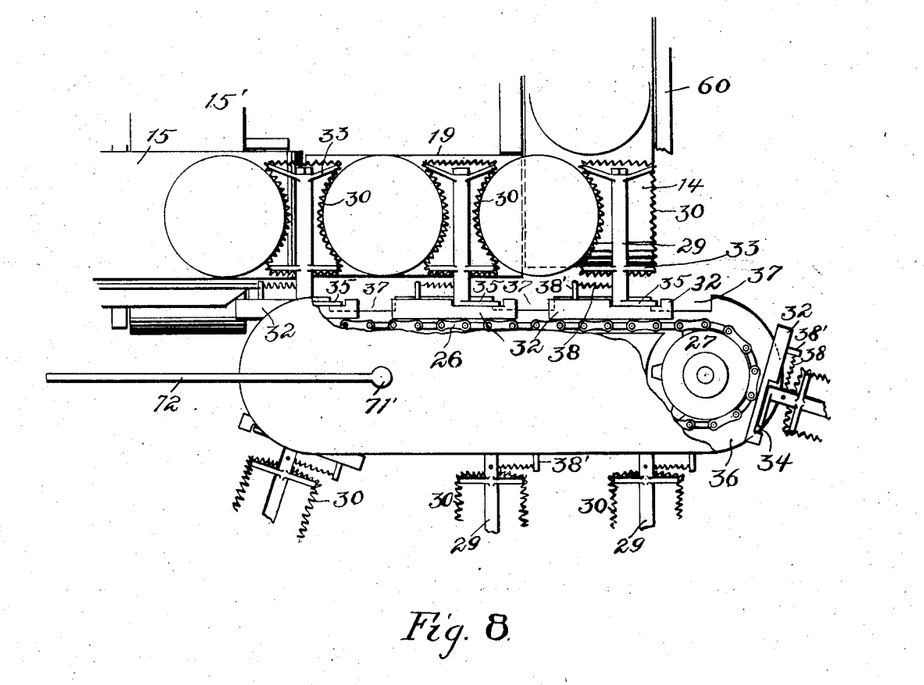
Fig. 8 is a partial top plan view showing some of the gripping-jaws in gripping relation to the cans.

As now considered slide-bar 68' is extended rearwardly and provided with a notch 73 in the under surface adapted to engage an operable slide-pawl 74, Fig. 6, which is pivotally connected to arm 75 of a pivotally-mounted rocker 76, carrying a second arm 77, operably connected to shaft 71 of the switch by a connecting-rod 77', pivoted at one end thereto and at the other end to arm 78, fixed to said shaft, and a spring 79, attached to last-said arm and to the frame of the machine, serves to swing the switch to an open position when pawl 74 is released from bar 68, Figs. 1 and 7. To release this pawl from notch 73, a spring-actuated push-pin 80 is slidably mounted on the bar with one end resting upon the pawl, and a spring 81 is suitably disposed to urge this pin to push the head of the pawl from said notch, and a check-lug 82 is disposed beneath the pawl at the advanced position of the head thereof to secure it in the notch at this point, Fig. 7. The cam 67', which operates slide-bars 68', is suitably formed and set to allow said bar to be retracted by a spring, as 83, as driver 39 is advancing to operate the shifter, and as pawl 74 rides clear of check 82 it is released from the bar by the push-pin 80 and the switch is released, so as to swing open by action of spring 79, in which position the switch as now considered normally lies with the pawl 74 resting inactive in retracted position, so as to allow the packages of standard weight to pass along conveyer 15. To conveniently set pawl 74 when resting in retracted position, so that it will engage in notch 73 as the slide-bar is advanced and thereby serve to close the switch, I have provided suitable pawl-operating mechanism, which is associated with the shifter-operating mechanism and operably controlled by suitable scale-operated mechanism arranged to act to normally block same from operating the pawl. The pawl-operating mechanism now considered includes a rock-beam, as 85, fixedly mounted on a suitably-supported pivot 85' over a suitable cam 86, secured to drive-shaft 45, and this beam is urged to rock by a suitable spring 87, attached to the outer end thereof, and a cam-roller 87' is mounted on this beam at a point intermediate pivot 85' and said spring. At the inner end of the beam a suitable downwardly-extending leg 88 is secured which carries a laterally-projecting foot 89, disposed beneath the retracted position of the head of pawl 74 and supporting same when disengaged from the slide-bar. The cam 86 is suitably formed to allow spring 87 to operate beam 85 at a predetermined part of the revolution, and thereby lift said pawl to engage notch 73 as the slide-bar is advancing, and thus close the switch, and as now considered the cam is suitably set on the drive-shaft to allow the beam to thus act just after a package has been brought to platform 19.

The mechanism for controlling the action of the pawl-operator includes a depending arm 90, secured to pivot 85', so as to swing with the rock-beam, and having a laterally-projecting strike-lug 90', arranged to pass between a pair of posts, as 91, as the beam acts to raise the pawl, and an operable gate, as 92, comprising a bar pivotally supported at one end, is suitably disposed to cause the free end to lie across the path of movement of said arm at the posts when the gate is properly operated. This gate is mounted on a stand, as 93, and is operably connected to one of the beams of scale 9 by a rod 94, pivoted to the gate closely adjacent the mounting, so as to increase the length of travel of the gate over that of the scale, and adjustably connected to a bracket, as 95, on the post 18 of scale 19 by oppositely-disposed nuts 96, having screw-threaded engagement with the upper end of this rod and embracing the bracket. The gate is properly set relatively to movement of the scale-platform to cause the free end to lie in the path of arm 90 when a package of standard weight is on the scale; but should a package of light weight be placed on the platform the gate is not swung sufficiently to block the path of the arm, and the pawl-operating mechanism will then be free to act to engage the pawl with bar 68, and the switch will be thereby closed as the bar is advanced and serve to force the light package to conveyer 15'.

In the present embodiment the machine is constructed to handle filled cans, and the several parts are rendered of suitable size to handle packages of this description, which are fed to the machine by placing them on conveyer 14 in an upright position. As the cans approach the delivery end of this conveyer they are engaged by check 62, the stops of which operate correlatively to shifter 12 to release one can during the lower half of each revolution of driver 39, and the conveyer advances the released can to shifter 12, as the jaws which are in position to receive same stand open. The shifter is operated during the upper half of each revolution of the driver and the jaws embracing the can close and grip same during the primary advance of the shifter and again open as the shifter comes to rest with the advanced can on the scale-platform, and a succeeding jaw will then stand open at the receiving-point. The scales will be operated by the advanced can as said jaws stand open, and if it be of standard weight the gate 92 will be brought thereby to check the pawl-operating mechanism, and as the pawl 74 is released from slide-bar 68 spring 79 swings switch 49 open and allows the tested can to be carried away by conveyer 15 when shifted thereto by the following step of the shifter. If, however, the can is under weight, the gate fails to act to stop the pawl-operating mechanism, which will act to reëngage the pawl with the slide-bar, and the switch will be thereby closed prior to a second step of the shifter and made to act to switch the can to conveyer 15' as it is removed from the scales. During the second step of the shifter the jaws, which stand open, close and grip the advanced can and also the one placed in the shifter by conveyer 14 during the pause of the shifter and which is advanced to the scale as the tested can is removed.

It will be thus seen that the machine is automatic throughout, and by regulating the gate 92 by adjusting the length of rod 94 the machine can be set to detect cans which are in the slightest degree under weight and assort them from those of standard weight as they are passed from the scales.

The machine is simple of construction, has few parts likely to get out of order, and is compactly arranged. Furthermore, it is positive in action, operates rapidly and accurately, and occupies but limited space.

Having thus described my invention, what I claim as new, and desire to secure by Letters Patent of the United States of America, is—

1. In a weight-testing and assorting machine, the combination with a frame, of a scale, package placing and removing mechanisms, a shifter operating across the scale intermediate the said mechanisms, a driver intermittently engaging the shifter, and means controlled by the scale for automatically assorting tested packages.

2. In a weight-testing and assorting machine, the combination with a frame, of a weight-testing apparatus, package placing and removing mechanisms, a shifter operating across the weight-testing apparatus intermediate the said mechanisms, a driver intermittently engaging the shifter, intermittently-operating means related to the said removing mechanism for assorting tested packages, and means operated by said weight apparatus for automatically controlling the assorting means.

3. In a weight-testing and assorting machine, the combination with a frame, of a scale, package placing and removing mechanisms, a shifter operating across the scale intermediate the said mechanisms, a driver intermittently engaging the shifter, intermittently-operating package-switching means related to said removing mechanism, and switch-controlling means operated by the said scale.

4. In a weight-testing and assorting machine, the combination with a frame, of a scale, package placing and removing mechanisms, package-switching arms operating laterally across the said removing mechanism, means to intermittently operate said arms, and means controlled by the scale for automatically setting said switch-operating arms to act.

5. In a weight-testing and assorting machine, the combination with a frame, of a weight-testing apparatus, package placing and removing mechanisms, means operating intermediate the said mechanisms for gripping and transferring packages, and means controlled by said weight-testing apparatus for automatically assorting tested packages.

6. In a weight-testing and assorting machine, the combination with a frame, of a scale, package-placing mechanism, package-removing mechanisms comprising a plurality of conveyers traveling in divergent paths, and means controlled by the scale for automatically switching tested packages upon said removing-conveyers.

7. In a weight-testing and assorting machine, the combination with a frame, of a scale, package-placing mechanism, package-removing mechanisms comprising a plurality of conveyers traveling in divergent paths, package-switching arms operating across the removing-conveyers to automatically switch tested packages, and switch-controlling means operated by the said scale.

8. In a weight-testing and assorting machine; the combination with a frame, and scale; of package-removing mechanism including a conveyer and a driver, a switch comprising arms mounted to swing across said conveyer, mechanism to intermittently operably connect said driver to the switch and means operably related to the mechanism of said scale to automatically control said connecting mechanism.

9. In a weight-testing and assorting machine; the combination with a frame, scale, a drive-shaft, and package-removing mechanism; of an intermittently-operable package-switch associated with said mechanism, a spring-retracted slidably-mounted pawl operably connected to said switch, a slide-bar operably connected with said shaft and adapted to engage said pawl, means to disengage said pawl at a predetermined point in the travel of said bar, a spring-retracted rock-beam, means carried by said shaft to operate the beam, means carried by the beam to urge said pawl to engage said bar when the beam is operated, and means operably connected to the mechanism of said scale to normally hold said beam inactive.

10. In a weight-testing and assorting machine; the combination with an operable package-switch, and a drive-shaft; of a spring-retracted pawl operably connected with said switch, a spring-retracted slide-bar adapted to engage with said pawl, a cam on said shaft to move said bar, means to disengage said pawl from the bar, at a predetermined point in the travel of said bar, a spring-retracted rock-beam, a cam on said shaft to move said beam, means associated with said bar to urge said pawl to engage said bar, and means operably connected to the mechanism of said scale to control the action of said beam.

11. In a weight-testing and assorting machine, the combination with a frame, of a scale, a package-shifter, a driver intermittently engaging the shifter, normally inoperative package-switching mechanism associated with the driver, and means connected with the mechanism of said scale for setting the switching mechanism to act.

12. In a weight-testing and assorting machine, the combination with a scale, a switch and a drive-shaft, of a plurality of conveyers, mechanism connected with said shaft to operate said switch across the said conveyers, and means operated by the scale to control the switch-operating mechanism.

13. In a weight-testing and assorting machine, the combination with a frame and scale, of a feed-conveyer, means for driving said conveyer, a feed-regulator comprising reciprocating spring-advanced stops, means operated by the driving mechanism for alternately retracting the stops, and a shifter for conveying packages from the feed-conveyer to the scale.

14. In a weight-testing and assorting machine, the combination with a frame, of a scale, a continuously-operating package-feed conveyer, means for driving the said conveyer, a feed-regulator comprising reciprocating package-engaging stops, means to normally yieldingly hold said stops in advanced position, means operated by the driving mechanism for alternately retracting the said stops, and a shifter for conveying packages from the feed-conveyer to the scale.

15. In a weight-testing and assorting machine, the combination with a frame, of a scale, a continuously-operating package-feeding conveyer, means for operating said conveyer, reciprocating package-engaging stops, means to yieldingly advance said stops; and a rock-bar connected with said stops and adapted to retract them alternately.

16. In a weight-testing and assorting machine, the combination with a frame and a scale, of a package-shifting device operating across the scale, a driver intermittently engaging the shifter for operating the same, means for conveying packages to the shifter, and means for conveying packages from the shifter in different directions.

17. In a weight-testing and assorting machine; a package-shifting device, a driver intermittently engaging the package-shifting device for operating the same, a conveyer adapted to bring packages to said device and a second conveyer to carry away packages.

18. In a weight-testing and assorting machine; the combination with a frame, and scale; of a package-shifting device operating across the scale, a driver intermittently engaging the package-shifting device to impart a step-by-step movement thereto, a continuously-acting conveyer adapted to convey packages to the shifting device, and a second continuously-acting conveyer for conveying packages from said shifter.

19. In a weight-testing machine, the combination with a frame, and scale; of a package-shifting device operating across the scale, a driver intermittently engaging said package-shifting device, a continuously-acting conveyer adapted to transport packages to said shifter, a second conveyer to carry packages away from said shifter and driving mechanism for operating said conveyer.

20. In a weight-testing and assorting machine; the combination with a frame, and weight-testing apparatus; of a package-shifting device adapted to place and remove packages relatively to said apparatus, a driver intermittently engaging the said package-shifting device to impart a step-by-step movement thereto, a conveyer for transporting packages to said shifter at one side of the apparatus, and a conveyer at the opposite side to carry tested packages from said shifter.

21. In a weight-testing machine; the combination with a frame, and scale; of a package-shifting device having laterally-projecting package-gripping parts adapted to place and remove packages relatively to said scale, a driver intermittently engaging the said shifting device, a conveyer disposed at an angle to the line of action of said device for transporting packages thereto at one side of the scale, and means at the opposite side of the scale for carrying packages away from said shifter.

22. In a weight-testing and assorting machine; the combination with a frame, and scale; of a shifter associated with said scale and comprising an operably-mounted endless belt, and laterally-projecting package-engaging parts carried on said belt, means to deliver packages to said shifter at one side of the scale, and package-assorting mechanism at the opposite side of the scale operably connected with the mechanism of said scale for automatically assorting tested packages.

23. In a weight-testing and assorting machine; the combination with a frame, and scale; of a shifter comprising an endless carrier having laterally-projecting package-engaging parts arranged to pass across said scale, a driver adapted to impart a step-by-step movement to said shifter, an endless conveyer at one side of the scale operably connected with said driver for delivering packages to said shifter, endless cross-conveyers at the opposite side of the scale operably connected with said driver for conveying away packages, a package-switching device associated with last-said conveyers and intermittently operably connected with said driver, and means connected with the mechanism of said scale for automatically controlling said switching device.

24. In a weight-testing and assorting machine; the combination with a frame, and scale; of a shifter 12 adapted to place and remove packages relatively to said scale, a package-feeding conveyer 14 disposed at one side of the scale at right angles to the line of action of the shifter, a package-removing conveyer 15 disposed at the opposite side of the scale, a conveyer 15' crossing said removing-conveyer, mechanism to drive said conveyers and shifter correlatively, an intermittently-operable package-switching device associated with said cross-conveyers and operably related to said driving mechanism, and means operably connected with the mechanism of said scale for controlling the action of said switching device.

25. In a weight-testing and assorting machine; the combination with a frame, and scale; of a shifter associated with said scale and comprising an endless belt mounted on wheels operating on a vertical axis, and horizontally-disposed package-engaging parts spaced equidistantly throughout said belt, a package-feeding conveyer disposed at one side of the scale with the active run passing beneath the line of movement of said package-engaging parts, a package-removing conveyer likewise disposed at the opposite side of the scale and a second package-removing conveyer, means to drive said conveyers and shifter correlatively, an intermittently-operable package-switching device associated with said removing-conveyers and operably related to said driving means, and means operably connected with the mechanism of said scale for automatically controlling the action of said switching device.

26. In a weight-testing and assorting machine, the combination with a frame, an endless package-placing conveyer, and an endless package-removing conveyer, a weight-testing apparatus intermediate said conveyers, an endless package-shifting device operating between the conveyers across the scale, a driver intermittently engaging the endless shifter, and means for operating the driver and the conveyers.

27. In a weight-testing and assorting machine, the combination with a frame, of a package-shifting device, comprising an endless carrier, a plurality of laterally-projecting rocking package-gripping jaws mounted on the carrier, and means to rotate said jaws by movement of said carrier.

28. In a weight-testing and assorting machine, the combination with a frame, of a package-shifter comprising, an endless belt, a plurality of laterally-disposed rocking gripping-jaws mounted on the belt, and means for rocking the jaws by movement of the said belt to open and close the jaws.

29. In a weight-testing and assorting machine, the combination with a frame, of a package-shifter comprising, an endless link belt, a plurality of laterally-projecting rocking package-gripping jaws mounted upon the belt, and means to rock the jaws by movement of said belt.

30. In a weight-testing and assorting machine, the combination with a frame, of a package-shifter comprising, an endless carrier, a plurality of laterally-projecting rocking package-gripping jaws mounted upon the carrier, and means for imparting a step-by-step movement to the carrier, and means whereby said jaws are rocked at predetermined points by movement of said carrier.

31. In a weight-testing and assorting machine; a package-shifting device, comprising a movably-mounted endless belt, a plurality of jaws operably mounted in package-gripping relations on said belt, means to impart a step-by-step movement to the belt and means whereby correlative jaws are opened as the belt comes to rest and are closed as the belt again moves.

32. In a weight-testing and assorting machine; a package-shifting device, comprising a movably-mounted endless carrier, rotatable jaws having oppositely-disposed faces operably mounted in package-gripping relations on said carrier throughout its length, and means whereby said jaws are rotated at predetermined points during movement of the carrier.

33. In a weight-testing and assorting machine; a package-shifting device, comprising a movably-mounted endless belt, laterally-disposed rotatable jaws having oppositely-disposed faces operably mounted in package-gripping relations on said carrier throughout its length, means to impart to said belt a step-by-step movement and means to rotate correlative jaws at predetermind points by movement of said carrier.

34. In a weight-testing and assorting machine; a package-shifting device, comprising a horizontally-disposed movably-mounted endless belt, laterally-disposed rotatable jaws having oppositely-disposed faces and operably mounted in package-gripping relations on said carrier throughout its length, means to normally hold the jaws with the faces in gripping position, means to impart to said belt a step-by-step movement and means whereby relative jaws are opened rotatably as the belt comes to rest and are closed rotatably as the belt again moves.

35. In a weight-testing and assorting machine; a package-shifting device, comprising an endless belt, wheels for said belt, mounted on vertically-disposed axles, a guideway, shoes in said way attached to the belt, horizontally-disposed jaws comprising stems rotatably mounted on the shoes and oppositely-disposed faces on the stems, and means whereby said jaws are opened and closed correlatively at predetermined points.

36. In a weight-testing and assorting machine, rocking package-jaws having normally parallel flexible faces composed of resilient material.

37. In a weight-testing and assorting machine; a package-gripping jaw having a flexible face comprising a coil of resilient wire supported at separated points.

38. In a weight-testing and assorting machine, rocking package-jaws having normally parallel flexible faces.

39. In a weight-testing and assorting machine; a rotatable jaw comprising a stem, laterally-projecting arms on said stem, and a flexible face comprising a coil of resilient wire supported on said arms.

40. In a weight-testing and assorting machine; the combination of a movable carrier, and a plurality of rotatable package-gripping jaws having oppositely-disposed faces and operably mounted on the carrier in gripping relations.

41. In a weight-testing and assorting machine; the combination of a movable carrier, and a plurality of rotatable package-gripping jaws having oppositely-disposed flexible faces composed of resilient material and operably mounted on the carrier in gripping relations.

42. In a weight-testing and assorting machine; the combination with a frame, and operable package-shifter; of a driver comprising oppositely-disposed cranks, a connecting-rod supported by said cranks and having shifter-engaging arms and means to operate said rod.

43. In a weight-testing and assorting machine; the combination with a frame, and an operable endless package-shifter having laterally-projecting parts spaced equidistant throughout its length; of a driver comprising oppositely-disposed cranks, a connecting-rod supported by said cranks and having arms adapted to engage said shifter parts, and a driving-crank operably connected with said rod.

44. In a weight-testing and assorting machine, the combination with a frame and a continuously-operating package-conveyer, of reciprocating package-stops, resilient means for normally holding the stops advanced, a rock-shaft for alternately retracting the stops, and means for connecting the stops with the rock-shaft.

45. In a weight-testing and assorting machine, the combination with a frame and a continuously-operating package-conveyer, of substantially U-shaped reciprocating package-engaging stops, springs for normally holding the stops advanced, stirrups connected to the stops, a rock-shaft for alternately retracting the stops, and a bar secured to the rock-shaft and engaging the stirrups.

46. In a weight-testing and assorting machine, the combination with a frame, of a package-shifting device, comprising an endless belt, wheels for said belt, a guideway for said belt having openings, shoes attached to said belt and running in said guide, laterally-projecting jaws comprising stems rotatably mounted on said shoes, and wipers connected to the stems, said wipers trailing in the guideway for controlling the rotating of the jaws.

47. In a weight-testing and assorting machine, the combination with a frame, of a package-shifting device, comprising an endless belt, jaws projecting from said belt, resilient faces on the jaws, and means for operating the jaws to cause them to act in pairs and grip a package between their adjacent faces.

48. In a weight-testing and assorting machine, the combination with a frame, of a scale, means for feeding packages, means for regulating the feed, a shifter for carrying packages across the scale, means for assorting packages tested by the scale operated by the feed-regulator and controlled by the scale, and a plurality of conveyers for removing the assorted packages from the machine.

49. In a weight-testing and assorting machine, the combination with a frame, of a scale, a continuously-operating package-feeding belt, an alternately-operating feed-regulator associated with the belt, an intermittently-operated package-shifter having gripping-jaws for carrying packages across the scale, an automatic switch-arm for assorting packages tested by the scale, means for operating said arm, a gate operated by the scale for operating the arm-operating means, and a pair of conveyers for removing tested packages from the machine.

50. In a weight-testing and assorting machine, the combination with a frame, of a scale, a switch acting in conjunction with the scale, a pawl mechanism for operating the switch, and a gate operated by the scale for controlling the pawl mechanism.

Signed at Seattle, Washington, this 8th day of August, 1902.

EDMUND AUGUSTINE SMITH.

Witnesses:
SAM H. FURBER,
ERNEST B. HERALD.